Oct. 3, 1944.　　　C. L. STOKOE　　　2,359,592
FLUID-FLOW METER AND THE LIKE
Filed Sept. 8, 1942
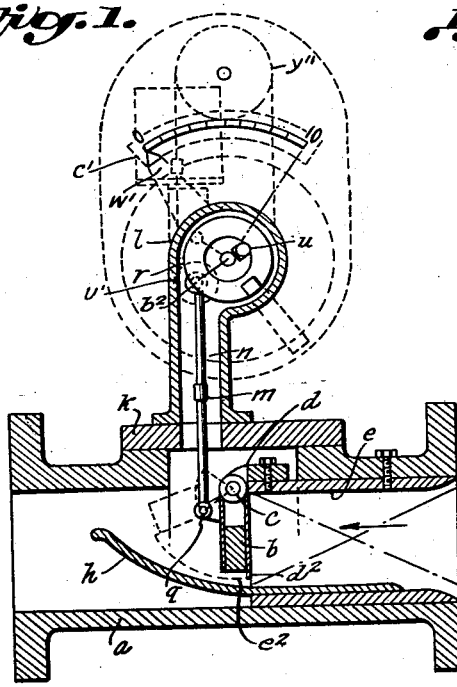
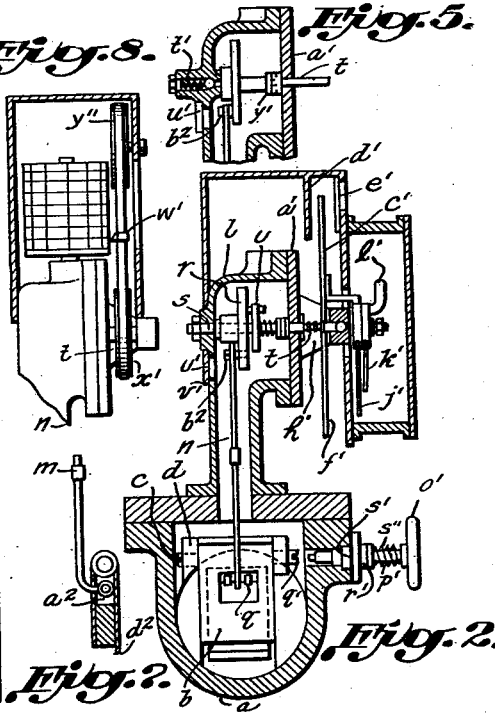
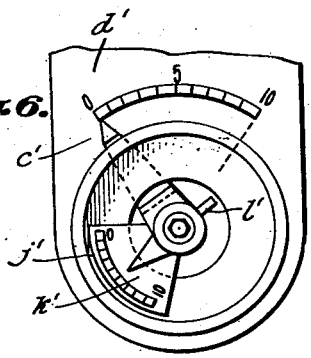
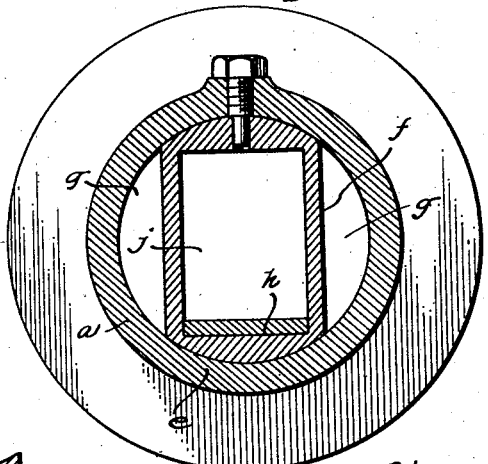
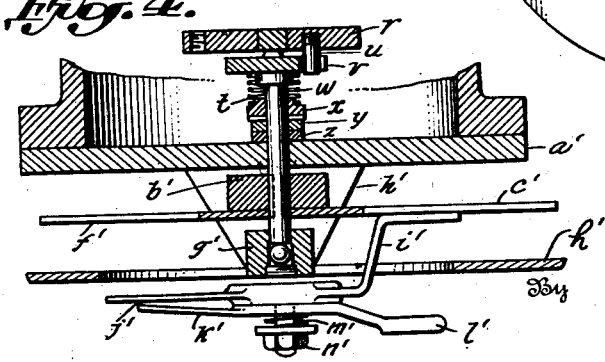
Inventor
CHARLES L. STOKOE Patented Oct. 3, 1944

2,359,592

UNITED STATES PATENT OFFICE 2,359,592

FLUID-FLOW METER AND THE LIKE

Charles Leslie Stokoe, Wallsend-on-Tyne, England

Application September 8, 1942, Serial No. 457,665
In Great Britain October 26, 1941

8 Claims. (Cl. 73—228)

My invention relates to improvements in fluid-flow meters and the like and has for its object to provide an improved flow meter or flow indicator of the kind in which the action of the moving fluid on a pivoted flap member located in the path of said fluid rotates a spindle to which is attached a flow-indicating pointer and/or flow-recording pen and/or a tappet or the like to bring into operation an alarm or control on predetermined alteration in flow through the pipe of which said flow meter may form a part.

According to my present invention a fluid-flow meter of the kind referred to differs from the prior art in that the spindle on which the flap is pivoted is not carried through the walls of the meter to transmit motion to an external pointer. My invention relates to the means I employ to transmit the angular movement of the flap to what I term in this specification the operating spindle, this being located in a chamber external to the meter bore, the connection between this spindle and the flap member being a connecting rod or link in conjunction with a crank. My invention also relates to the combination of this link with the means I employ to prevent leakage past the aperture through which the operating spindle projects to the atmosphere. Other features of my invention include the means for testing the freedom of movement of the flap member without putting undue strain on the operating spindle and connections. I also describe and illustrate the means I adopt with a view to ease of construction, simplicity of design, the special shape of the flap, inlet bush and outlet guide plate for improved flow indication; also one means I adopt to equalize approximately the movements of the flow-indicating pointer when the outlet plate is omitted to allow of increased flow indicating capacity. I also describe one means I adopt for recording the variations of flow over a period of time by means of a pen or pencil attached to a band or cord laid round two pulleys. The means of absorbing the end-thrust on the operating spindle due to high internal fluid pressure is described and also how I arrange for the adjustable tappet to clear the outer bearing of said operating spindle and the means for showing by a pointer over a graduated dial at what point on the meter dial the alarm or control will come into operation. The special crank disc for relieving strain from the operating spindle due to the pull of the link or connecting rod because the disc carries the weight of such link and provision for access to the pin of said connecting rod for assembly or overhaul are described also the means of assembly of the bush, flap member and flap spindle bracket together with the outlet plate prior to insertion in the bore of the meter. Provision is also made for arranging the meter to be suitable for any specified direction of flow, for example, to the right, to the left, or upward flow.

In order to make my invention clear, reference is made to the accompanying drawing wherein:

Fig. 1 is a sectional elevation of my improved meter.

Fig. 2 is a cross section of my improved meter.

Fig. 3 shows a section of the body of the meter wherein is located the bush which carries the flap spindle bearings and which also forms a seat for said flap, the bush sides shown in section being utilised to guide the flow of the fluid and assist streamline flow past the flap.

Fig. 4 shows details of the operating spindle and connection to the crank disc also the arrangement of the tappet attachment to the flow indicating pointer, to clear the bridge for overhaul.

Fig. 5 shows how the operating spindle may be constructed for cases where the internal fluid pressure is low.

Fig. 6 shows the relative positions of the tappet indicator pointer with reference to the flow-indicating pointer, this being adjustable for predetermined alteration of flow, with meter in service.

Fig. 7 shows alternate fulcrum attachment of the link rod to that illustrated in Fig. 1 in order to open out the close readings towards the full open positions of the flap when the outlet plate is omitted in order to provide greater flow indicating capacity for that size of meter.

Fig. 8 shows one arrangement of pen movement for recording the rate of flow over a period of time on a moving chart, on clock drum. Various forms of flow meters and flow indicators have been devised on the swinging flap principle, one type employing link motion to operate a spindle projecting from an upper chamber for the purpose of recording the rate of flow on a moving chart. Owing to the difficulty of making the spindle aperture fluid-tight the diameter of the spindle was of necessity too small for the purposes set forth in this present specification as a packed gland causes too much friction when screwed up the necessary amount to prevent undue leakage. Leakage past the spindle aperture of any meter can be a serious commercial drawback. In my previous constructions of flow meters and flow indicators with alarm and control equipment and operating on the swinging flap principle I have mounted the flap on a spindle supported by bearings located in the walls of the meter body, one or both ends of said spindle projecting through the bearing or bearings to which is attached the means for indicating the intensity of flow and/or to operate alarm or control on predetermined alteration in rate of flow. One of the objects of my present invention herein described is to translate the motion of the flap member to an operating spindle of ample strength for the purpose without the necessity of boring the walls of the meter body for the reception of bearings and also as previously stated to allow the flap member to be assembled complete with the guide bush and the outlet plate (when fitted) before insertion in the meter bore. A further object of my present invention is the location of the flow indicating, flow recording and alarm or control attachments above (or clear) of the meter body so that it can be under observation without obstruction. A desirable feature in a flow meter or flow indicator is the ability for testing the freedom of the internal members whilst in service, hence the purpose of the testing wheel illustrated in Fig. 2.

In Fig. 1 the meter body $a$ is bored uniformly the whole length (to the diameter indicated). $b$ is the flap member pivoted on spindle $c$ supported by bearing bracket $d$, the bracket being bolted to the bush $e$ which also forms a seat for the flap in the no-flow position. The sides of the bush Fig. 3 at $f$ form guides to assist streamline flow towards the flap member. My tests denote that the segmental open sides at $g$, $g$, produce a more steady flow indication than when closed, the outlet plate $h$ being approximately the same width as the flap which it will be observed is rectangular in shape and does not project quite to the bottom of the central rectangular opening $j$ in the bush. The width of opening $j$ may be approximately half the diameter of meter bore. The bush $e$ is made interchangeable end for end in the body of meter $a$ so that if desired the direction of flow may be to the right, as seen from the observer. For the same reason the cover $k$ may be made reversible, although I may provide alternate means for turning round the face of the meter dial and connected parts to face any direction by means of the swivel union $m$ in the connecting rod or link $n$. The rod $n$ is connected at one end to disc $r$ and at its lower end to a crank pin $q$, attached to the flap as the intensity of flow increases. This rotates the crank disc $r$ which disc is fulcrumed between the ends of a fixed spindle $a$ located in the side of the chamber $l$. The rotation of crank disc $r$ is transmitted to the operating spindle $t$ by the crank pin $u$ engaging in slot formed in disc $v$ attached to the operating spindle. A compression spring $w$ on the operating spindle gives axial pressure to the sliding collar $x$ faced by an anti-friction ring $y$ which in turn presses the resilient washer (or washers such as leather) $z$ onto the inner face of the bearing formed in the cover $a^1$ to prevent leakage past the spindle aperture. The operating spindle $t$ carries a boss $b^1$ which for convenience of assembly may be bolted in halves, to which is attached the flow indicating pointer $c^1$ which moves over the graduated dial $d^1$ to denote the intensity of fluid flow through the meter. The pointer is visible through the window $e^1$. Attached to the boss $b^1$ below the pointer is a test lever $f^1$ by which the action of the operating spindle may be "felt." End thrust due to internal fluid pressure on the projecting area of the operating spindle is absorbed by the ball thrust bearing $g^1$ supported by the bridge $h^1$ attached to the cover $a^1$. The tappet gear by which the alarm or control mechanism is brought into action on predetermined alteration of flow through the meter, is carried by a bracket $i^1$ secured to the pointer $c^1$ and projects clear of the bridge $h^1$. This bracket carries a graduated dial plate $j^1$ over which a pointer $k^1$ may be moved round by hand to any desired mark representing the equivalent flow marking on the main flow indicating dial $d^1$ at which the alarm or control is to be operated by the projecting tappet $l^1$. The compression spring $m^1$ held by the nut $n^1$ thread on shaft fixed to the bracket $i^1$ keeps the pointer located. The projecting tappet $l^1$ may be used for example in the case of mechanical alarm or control to tilt up a lever operated valve in connection with a source of compressed air supply to sound a whistle or operate a servo-motor or the like. In the case of electrical alarm or control the tappet may tilt up an insulated lever in connection with "make" or "break" contacts, to sound a bell or horn or to operate a control switch to stop or start a motor or the like. Referring to Fig. 2 it will be seen that the freedom of the flap movement may be tested by means of the push hand wheel $o^1$ attached to the rod $p^1$ which is provided at its inner end with a clutch to engage a corresponding slot $q^1$ in the end of the flap spindle $c$. Leakage past the rod aperture is prevented in the normal position by the reaction of the compression spring $s''$ threaded on the external portion of the rod which presses a resilient (such as leather) washer $r^1$ onto the inner face of the bearing $s^1$ and which normally provides for the push handle to be "out" with the clutch clear of the flap spindle. The testing of the flap member of course tests the various moving members in connection therewith.

Fig. 5 shows a simplified arrangement of the operating spindle for cases where the internal fluid pressure is very low and the external thrust bearing not so essential. Here the operating spindle is continuous and combines the crank disc $r$ to which it is attached. With this arrangement I provide for the resilient washers or washer to be pressed up against the inner face of the bearing in cover $a^1$ by a compression spring $t^1$ axial to and at the back end of said spindle the thrust being transmitted by a ball which presses on the end of the operating spindle with minimum friction. The sliding collar $x$ shown in Fig. 4 is now replaced by a collar $y^1$ rigidly attached to the operating spindle. Access to the connecting rod top pin $b^2$ for ease of assembly and overhaul is by way of the opening in the wall of the chamber $l$. The opening $u^1$ with cover $v^1$ opposite the pin $b^2$ permits removal of the connecting rod $n$ from the crank disc $r$.

Fig. 8 shows one means I adopt for recording the rate of flow over a period of time. The pen $w^1$ attached to a band or cord laid over the pulleys $x'$ and $y''$ on their respective spindles and the pen rises or falls in accordance with the variations of flow through the meter. The chart is suitably ruled and rotates with the usual clock type of drum. With the outlet plate $h$ correctly proportioned the flow "curve" becomes a straight line. With the outlet plate omitted the flow curve may be straightened out by suitably proportioned link motion, a simple illustration being given by Fig. 7 where the lower end of the connecting rod is cranked on the vertical centre line at $a^2$ instead of at $q$ in Fig. 1. Without this feature the angular movement of the flap member is at first too fast and towards the full flow position too slow to give a good graph. It will be seen that when the lower fulcrum is located on the centre line and the upper fulcrum located at say $b^2$ as in Fig. 1 the flow indicating pointer $c^1$ will move through a given angle more slowly than the flap member at first and more quickly than the flap member towards the full flow position.

The correct eccentricity of the contour of the outlet plate in order to give a straight line graph is so important that the manner in which the parts are constructed whereby the outlet plate together with flap member may be assembled onto the bush before insertion in the bore of the meter forms an important feature of my invention. The contour of the outlet plate is obtained from actual flow test on what may be termed a "standard" meter for any given size so as to enable new meters to be manufactured to the same dimensions thereby rendering unnecessary actual flow test on each meter. I also provide for more accurate flow indication by prolonging the tip of the flap as shown at $d^2$ in Fig. 1 so that the issuing fluid will not impinge on the weighted portion of the flap member at $e^2$.

I previously referred to provision for making the meter suitable for say flow to the right, to the left, or upward flow. Referring to Fig. 1 it will be observed that the flow is to the left but can be arranged for flow to the right by reversing the bush $e$ end for end and reversing the cover $k$ likewise, or as before mentioned turning round the external chamber $l$ and cover $k$ provided the swivel joint $m$ is included. For upward flow the external chamber would then be horizontal but the flow indicator dial and recording gear can be arranged to lie in the vertical plane.

It is obvious that the details of my flow meter could be modified without departing from the nature of my invention.

Having now particularly described and ascertained the nature of my said invention, and in what manner the same is to be performed, I declare that what I claim is:

1. A fluid flow meter or the like comprising, in combination, a conduit having fluid flow bore and having a pivotally mounted flap member mounted therein, a meter casing mounted upon said conduit having a fluid-tight connection therewith, a crank disk and link mechanism mounted in said casing and connected with said flap member, an operating spindle for said crank disk extending out through one wall of said casing, means for testing the freedom of said flap member from outside of said casing, means for rendering the aperture through which said last named means passes fluid-tight, means connected to said spindle for indicating the rate of flow over a period of time, means for inducing a streamline flow past said flap member, and means for positioning the flow indicating means to any desired position with respect to the flap member, as desired.

2. A fluid-flow meter or the like as set forth in claim 1, including means whereby the aperture through which the operating spindle projects to atmosphere is rendered fluid-tight, said means including a spring and a resilient washer pressed by said spring against the inner wall of the casing through which the spindle projects.

3. A fluid-flow meter or the like as set forth in claim 1, including means whereby end thrust on said operating spindle due to internal fluid-pressure is absorbed by an external thrust bearing forming a stop for the projecting end of the spindle, said spindle having a spring-pressed antifriction collar and adjacent-resilient-washer in said casing.

4. A fluid-flow meter or the like as set forth in claim 1, wherein the means for inducing a stream-line flow through the conduit include an inlet guide-bush, having two vertical walls which form a seat for the flap face in the no-flow position, said vertical walls bounding a central rectangular shaped aperture of an approximate width of half the diameter of the path of fluid flow, the segmental shaped openings at outer sides of said vertical walls forming a direct passage for a portion of the fluid-flow past the flap member.

5. A fluid-flow meter or the like as set forth in claim 1, wherein the tip of flap face terminates short of the bottom of the path of fluid flow, said flap member having a weighted portion behind the face of flap arranged to clear the efflux from below the tip of flap face.

6. A fluid-flow meter as set forth in claim 1, wherein the means for testing the freedom of movement of the flap member includes a rotatable road projecting through a fluid-tight aperture in the wall of the meter casing, said rod being provided with an internal clutch element adapted to coact with said flap member, said element being normally clear of said flap member.

7. A fluid-flow meter as set forth in claim 1, including an outlet plate approximately the same width as the flap face and comprising a part thereof suitably curved with relation to the path of travel of the flap member, said means for inducing a streamline flow including an inlet bush, a flap spindle bearing bracket mounted directly on the said inlet bush and together forming a unit for convenient assembly in the fluid-flow bore of the conduit.

8. A fluid-flow meter as set forth in claim 1, in which said flow indicating means includes a dial, means for turning said dial relative to the meter casing, a link connected with said dial and arranged on the vertical center line of the casing, and a swivel coupling to facilitate such operation.

CHAS. L. STOKOE.